United States Patent [19]

Szynka

[11] 3,804,220
[45] Apr. 16, 1974

[54] CLUTCH-COUPLING ASSEMBLY
[75] Inventor: Peter Szynka, Witten/Ruhr, Germany
[73] Assignee: Lohmann & Stollerfoht Aktiengesellschaft, Witten/Ruhr, Germany
[22] Filed: Dec. 11, 1972
[21] Appl. No.: 314,215

[30] Foreign Application Priority Data
Dec. 17, 1971 Germany............................ 2163820

[52] U.S. Cl....... 192/85 AB, 192/85 AA, 192/55 M
[51] Int. Cl.......................... F16d 25/12, F16d 7/00
[58] Field of Search............ 192/48.3, 55 M, 70.17, 192/70.19, 85 AA, 85 AB; 64/10, 11, 13, 27 NM

[56] References Cited
UNITED STATES PATENTS
| 3,557,573 | 1/1971 | Hansgen | 192/85 AB |
| 3,708,048 | 1/1973 | Szynka | 192/85 AB X |
| 1,849,164 | 3/1932 | Wood | 192/70.19 |
| 3,504,509 | 5/1970 | Paulsen | 64/27 NM X |
| 3,329,244 | 7/1967 | Nielsen | 192/85 AA X |
| 3,082,613 | 3/1963 | Reed | 64/13 X |
| 2,502,798 | 4/1950 | Nabstedt et al. | 192/85 AA X |

Primary Examiner—Benjamin W. Wyche
Assistant Examiner—Lance W. Chandler
Attorney, Agent, or Firm—Smyth, Roston & Pavitt

[57] ABSTRACT

A friction clutch-resilient coupling has a clutch input, a disk as coupling output and a hydraulically operated movable clutch member which is also the input for the coupling. The coupling includes plural, coaxial, sleeve-rubber-sleeve elements distributed in annularly arranged apertures of the disk and having their inner sleeves bolted to the clutch member. Specific examples of such assemblies are explained with reference to a double cone friction clutch and a twin friction disk clutch, having two movable clutch members as well as two such disks. The resilient elements are always biased tending to disengage the clutch.

11 Claims, 4 Drawing Figures

CLUTCH-COUPLING ASSEMBLY

BACKGROUND OF THE INVENTION

The present invention in general relates to a clutch arrangement and more in particular friction clutch with limited elastic capabilities especially for use with Diesel engine devices for pumps, compressors and generators.

Clutches of this purpose are known, for example, to comprise a clutch casing provided with conical internal friction surfaces coacting with clutch members having corresponding conical surfaces. The clutch members are spaced in axial direction and urged against the casing to engage the clutch.

The clutch members are spread hydraulically, but upon pressure relief, the resilient elements restore the clutch members into a clutch-disengaging position.

Conventionally, the end flange of the casing is fixedly connected to the flange of a driving shaft or hub. The clutch members are connected to a driven shaft by means of annularly arranged resilient elements provided for an elastic (torsional) coupling between clutch members and output shaft.

However, clutch systems incorporating such resilient elements have the disadvantage that not all axial, radial and angular displacements occurring within the clutch system can be compensated for or balanced due to the inherent characteristics of such elements. Moreover, the torsional elasticity of the resilient coupling part is significant, and often too large. The annular arrangement of resilient parts even renders the clutch output (axial displaceable clutch members) and the coupling output amenable to oscillators relative to each other.

SUMMARY OF THE INVENTION

It is an object of the invention to provide a friction clutch which is able to compensate axial, radial and angular displacements occurring in the clutch aggregate for example, as a result of inaccurate mounting and special operating conditions. The clutch should still be substantially flexible but which, nonetheless, has quite limited and low torsional elasticity.

In addition, it is an object of the invention to provide features as to maintain the degree of torsional elasticity within fixed limits, even if the friction linings become worn.

A further object of the invention is to solve the problem of providing the clutch members with restoring elements which are simple in design, inexpensive to manufacture and assemble, and are substantially maintenance-free and which do not impart significant torsional elasticity upon the clutch.

The clutch of limited torsional resiliency to be improved in accordance with the present invention, is to have a driving, primary input for connection to a drive shaft and a driven output which is also the drive input for a resilient coupling and constitutes a movable clutch member; friction means are provided between the primary driving input and the said driven output and clutch member; a driven output subh as an output hub of the resilient coupling is provided for connection to an output shaft. The driven output (clutch member) of the clutch is to be actuated, e.g., hydraulically for obtaining frictional engagement, via the friction means, between the clutch member and the driving, primary input.

In accordance with the preferred embodiment of the invention, it is suggested to provide a disk with annularly arranged, distinct and separated apertures and to secure the disk to the output proper of the assembly; resilient elements, each in coaxial configuration of an inner sleeve-resilient material-outer sleeve are inserted in the apertures, whereby the outer sleeves are secured to the disk and the inner sleeves are secured to the movable clutch member; the resilient elements are resiliently biased axially for urging the clutch member into, e.g., disengaging position as to the primary clutch input. Preferably, these elements are constructed in coaxial tubuler configuration with metal-rubber-metal bond structure.

In this manner, a friction clutch is provided which, as a result of the above construction of the elastic elements, has low elasticity in radial direction, particularly in comparison with the high torsional elasticity involved in conventional shaft coupling. This is due to annular separation of the elastic elements, by the rigid spokes of the aperture disk in between the apertures thereof. However, regardless of the low elasticity in the radial direction, the friction clutch as such is able to provide elastic reaction in axial direction which is sufficiently high to produce the restoring force necessary to replace the clutch member into initial or clutch-disengaging position by operation of these biased elastic elements.

A particular advantage of the novel construction of the restoring elastic elements is that the torsional elasticity of the clutch arrangement is determined not only by the material of the elements, i.e., by the elasticity of a rubber layer between the coaxial sleeves as hereinbefore described, but primarily by the fact that this layer is in fact positioned between two sleeves, and plural such arrangements are mounted in the aperture disk, by which arrangement the maximum admissible torsional angle of the coupling parts is determined by the distance between the inner and otuer sleeves. The range of possible angular displacement between clutch member and disk is guite limited. For these reasons, additional protection against torsion, which is usually necessary in high-elastic coupling of the shafts, is rendered superfluous.

The clutch arrangement distinguishes itself by its simplicity of construction. In disengaged position of the friction clutch, the clutch arrangement is rattleproof since a loose oscillating motion of the clutch member can be avoided by conventionally pressing and centering the clutch member against a steadying wheel as a stop means and being attached to the clutch output hub and running (or stopping therewith. Such pressing and centering of the clutch member is still effected by the elastic elements if they are not completely unbiased when the clutch member abuts the stop means by means of auxiliary friction surfaces thereof. Also, the elastic elements are arranged so as to control and guide the clutch member during engagement and disengagement of the clutch.

A related feature of the invention concerns the wear and tear of the friction linings of the friction clutch. The metal outer sleeve of each elastic element, in released or relaxed condition, is offset in the axial direction relative to the metal inner sleeve and to an extent larger than the maximum axial control motion of the clutch member needed, for example, in case of a completely worn friction lining of the member. Under such conditions, the end faces of inner and outer sleeves should be about coplanar.

A still related feature of the invention resides in that the elastic elements are arranged such that they are still pretensioned in the axial direction for disengaged condition of the clutch, in which condition a conical internal surface of the clutch member bears against a corresponding conical surface of the above-mentioned steadying wheel on the clutch and coupling output hub.

The elasticity of the elastic elements relative to the torsional elasticity of the clutch can be varied by adding one or more intermediate metal rings into the rubber layer of the element intermediate the inner and outer sleeves thereof. Such insertion of additional rings into each of the elements effects an increase of the elasticity constants, i.e., of the stiffness of the elements under radial load application, without diminishing the restoring force of the elements to a substantial degree.

The invention will be practiced with particular advantage in double cone friction clutches with an internal double cone as operating surface of the primary drive input, and two frictional clutch members are provided which may be spread apart axially by hydraulic means for clutch engagement. Two apertured disks are mounted on the output hub and respectively coacting with the two members. Each disk holds the resilient elements whose inner sleeves are bolted to one of the members which is coupled therewith to the disk and hub.

In a further embodiment of the invention, the clutch arrangement is in the form of a single-flange multiple disk clutch in which disk-shaped clutch member are symmetrically positioned on both sides of a single annular disk serving as rotary primary input. The clutch members are bifurcated in axial cross section to hold the resilient elements in between as well as to receive respectively the apertured disks in which the outer sleeves of the resilient elements are mounted.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DESCRIPTION OF THE PREFERRED EMBODIMENTS

Figure 1:
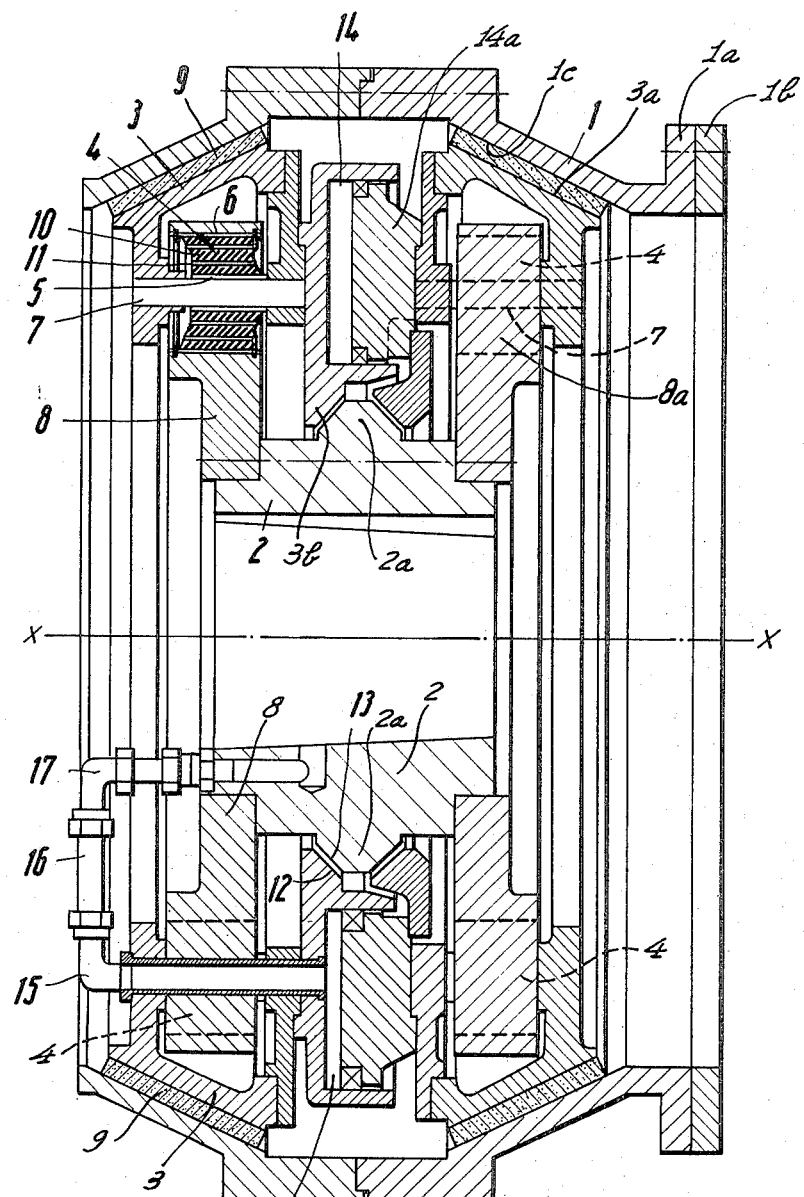
FIG. 1 is a cross sectional view of a double cone friction clutch improved according to the invention.
Figure 2:
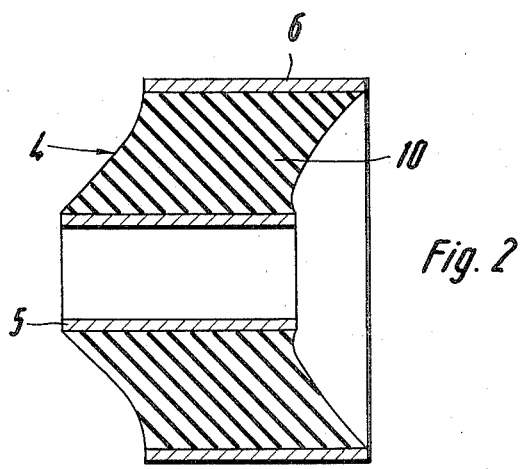
FIG. 2 is an enlarged front view of the elastic elements constructed in accordance with the invention to be incorporated in the arrangement of FIG. 1 as an alternative.

Referring now to the drawings in which like reference numerals index similar parts or parts of similar function and with attention initially drawn to FIG. 1, there is shown a double cone friction clutch actuated under the action of a pressure medium, for example, pneumatically or hydraulically. The clutch arrangement is seen to comprise a friction clutch including a casing 1, having a flange 1a arranged to be fixedly connected to the flange 1b of a driving shaft, not shown. The casing constitutes the primary section of the friction clutch. Casing 1 is, therefore, the drive input of the arrangement. The drive output of the assembly is taken from a hub 2, to which is secured a shaft (not shown).

The double cone friction clutch includes a pair of frusto conical members 3, arranged in axial displacement relative to each other, so as to engage or disengage from the tapered surfaces 1c of casing 1. The conical or frusto conical surfaces of members 3 are designated 3c, and they carry friction linings 9, for engagement proper of casing 1 whenever the clutch is activated.

A hydraulic cylinder 14 is secured to and part of one of the members 3. Particularly, the annular cylinder 14 is attached to and part of the large diameter end of the one cone. A piston 14a coacting with and running in cylinder 14 is secured to and part of the other member 3, at the large diameter end thereof.

Upon feeding a pressure medium into cylinder 14, the clutch members are urged apart in the axial direction and into engagement with the casing 1 in which condition the friction linings 9 on the member 3 bear against the conical surfaces 1c of casing 1.

The clutch members 3, supplemented by the piston-cylinder arrangement, have inner ends facing the clutch hub 2 and annular projections 3b are defined at these ends. These inwardly projecting rings are provided with conical surfaces 12, which, in the disengaged position of the clutch bear against the double conical, external surface 13 of a clutch hub projection 2a. That projection constitutes the annular, steadying wheel alluded to above and serves as stop for limiting resilient retraction of the clutch members when the hydraulics 14 — 14a are pressure relieved.

The clutch members 3 constitute the driven output of the double cone friction clutch, but they constitute also the drive input of an elastic coupling, whose driven output is the hub 2. Accordingly, resilient elements 4 are arranged between the clutch members 3 and the hub 2, which thereby become respectively the primary section and secondary section of the elastic coupling of the assembly. The elastic elements 4 are uniformly distributed over an annular area at a fixed radius relative to the longitudinal center axis $x — x$ of the clutch arrangement as a whole.

Each of the elastic elements 4 is formed by an inner metal ring or sleeve 5, an outer metal ring or sleeve 6 and a layer of rubber 10 interconnecting the inner sleeve 5 and outer sleeve 6. The rubber is bonded to the metal of both sleeves 6. The inner sleeves 5 are individually bolted to the respective clutch member 3. The outer sleeves 6 are inserted in and secured to the walls of apertures in a disk 8 having as many apertures as there are resilient elements 4. It should be noted that there are two such disks 8, one each for coaction with the respective member 3, and each disk has such resilient elements 4 for coupling the disk to the respective member 3. Both disks follow positively position and rotation of hub 2. The apertures of disks 8 are separated from each other, forming what can be described as rigid spokes 8a in between.

Figure 3:
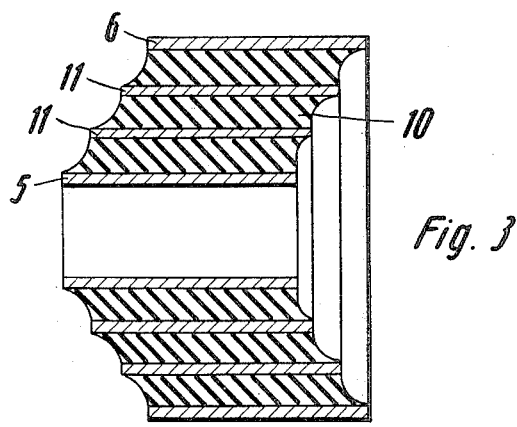
FIG. 3 is a view similar to FIG. 2 but illustrating in greater detail the elastic elements used in FIG. 1.

In order to vary the elasticity of the elastic elements relative to the torsional elasticity of the clutch as such, as hereinbefore disclosed, a plurality of additional intermediate metal rings 11 are vulcanized in rubber layer 10 between the bushing or inner ring or sleeve 5 and the outer ring or sleeve 6. An example for this kind of resilient element is depicted in greater detail in FIG. 3, showing the unbiased, relaxed state of the elements. Upon insertion in the respective aperture of a disk 8, as well as upon bolting sleeve 5 to the respective member 3, bias will result through forced axial displacement of sleeve 5 relative to sleeve 6. The sleeves will have coplanar end faces when in fact members 3 abut casing 1 with little or no friction lining left.

The elastic elements, as will be appreciated from the foregoing disclosure, provide an elastic force which serves to restore the clutch bodies into their initial or clutch-disengaging position when pressure is released on the piston 14a, the clutch being, of course, in its engaged position when clutch members 3 are pressed against casing 1. It should be noted that the restoring elastic elements are pretensioned in the axial direction in disengaged position of the clutch. This means, that the resilient elements are always biased, tending no axially contact members 3 into clutch-disengaging position. Specifically, the elements, when inserted in the apertures of disk 8 and when bolted to members 3, as described, will never be able to assume their completely relaxed state due to stop ring 2a.

The clutch arrangement as shown in FIG. 1, is in its engaged position as a result of the hydraulic force acting in cylinder 14 on piston 14a. In turn, the pressure to the piston is supplied via the driven shaft that is secured to hub 2, but is not shown. A conduit system, in the form of the pipe sections 17, 16, and 15, serves to receive pressure through the driven shaft, and to provide hydraulic pressure to the cylinder whenever the clutch is to be engaged. Upon relief of pressure on piston 14a, elastic elements 4, which are under increased tension, effect the disengaging of the clutch, in which condition the elastic forces of elements 4 restore members 3 into an initial position. During this return of members 3, the latter move in axial direction mirror-invertedly towards each other until their conical surfaces 12 abut the conical surfaces 13 of the clutch hub 2; this then is the initial position of members 3.

Figure 4:
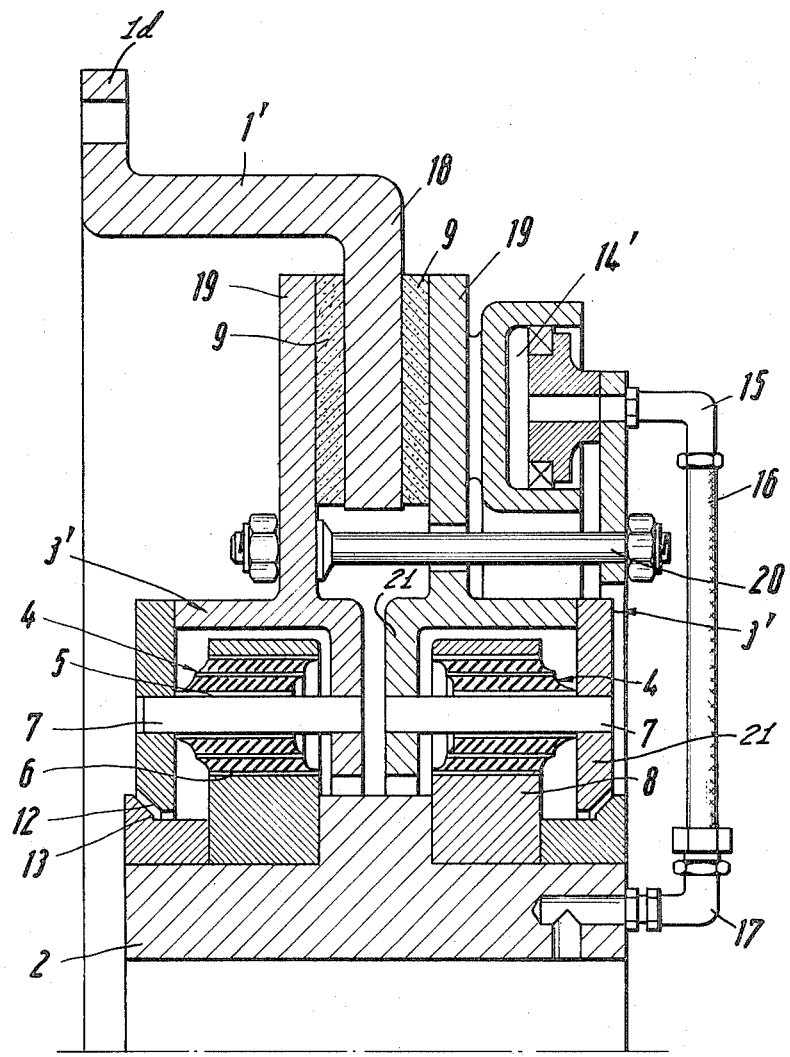
FIG. 4 is a cross sectional view of another embodiment of the invention, illustrating a single-flange multiple disk clutch.

FIG. 4 illustrates a single-flange multiple (twin) disk clutch in engaged position. The clutch is seen to comprise a single-clutch plate or annular disk 18 of the primary section 1' of the friction clutch. The section 1' terminates in a flange portion 1d, which is arranged to be secured to the flange portion of a driving shaft which is not shown. A pair of disks 19 is provided symmetrically on both sides of the apertured plate 18, and friction linings 9' are disposed between the latter and the apertured plate or disk 18. The disks 19 actually constitute the principal point of the clutch members 3, which are bifurcated otherwise in direction of the hub 2 and they terminate in parallel disks or arms 21. The elastic elements 4, as shown, have their sleeves 5 bolted to one of the elements 21 as respectively secured to clutch members 3', but slide in the other. The respective sleeves 6 are inserted into apertures of plates 8 and secured thereto as before.

Reference numeral 14' refers to the hydraulic actuator for the clutch. A connecting bolt 20 is provided for the transfer of contact pressure from the piston to one of the disks 19. The other one is secured to the piston chamber of hydraulic drive 14'.

While various modifications of the disclosed embodiments may occur to those skilled in the art, it should be noted that the invention particularly obviates the use of metallic telescopic guides or sleeves to effect motion of the clutch members, especially for reasons that such guides or sleeves are subject to frictional corrosion when the clutch arrangement is used in aggressive atmospheres.

The invention is not limited to the embodiments described above but all changes and modifications thereof not constituting departures from the spirit and scope of the invention are intended to be included.

I claim:

1. In a clutch-coupling assembly with relatively low resiliency and including a primary input for connection to a drive shaft; a clutch member for frictional engagement with the input, there being a friction lining interposed, the clutch member serving as drive input for and of a resilient coupling, the coupling having an output for connection to a shaft that is to be driven by the clutch-coupling assembly, the assembly including means for urging the clutch member into frictional engagement with the primary input, the means when relieved, ceasing said urging; the improvement comprising:

a disk having individual, annularly arranged apertures and secured to and being part of said output of said coupling and being coaxial thereto;

a plurality of resilient elements each having a metallic outer sleeve, a metallic inner sleeve coaxial to the outer sleeve, and resilient means bonded to the inner and outer sleeves, the elements respectively received in the apertures of the disk for being annularly arranged about the axis of the disk and having their respective outer sleeves secured thereto, so that the several elements are axis parallel to each other and to the axis of said coupling output, and of said disk; and means for securing the inner sleeves of the elements to said clutch member; the resilient elements being axially biased for normally keeping the clutch member disengaged from said primary input when said means for urging are relieved.

2. In a clutch as in claim 1, the resilient elements having particular disposition of relative axial displacement of the respective inner and outer sleeve when unbiased, there being stop means for preventing the return of the elements to the particular dispostion when the resilient elements resiliently retract so as to disengage the clutch member from said input, so that the resilient elements remain biased.

3. In a clutch as in claim 2, the sleeves having axial end faces about coplanar, at least on one side, when the means for urging has caused the member to engage the primary input and for substantially worn friction lining in-between the member and the input.

4. In a clutch as in claim 1, wherein at least one additional concentric sleeve is disposed between inner and outer sleeve of each said resilient elements, the additional sleeve being inserted in the resilient means.

5. In a clutch assembly including a primary input for connection to a drive shaft; a pair of coaxial clutch members for frictional engagement with the input; hydraulic means for urging the clutch members in opposite axial direction to obtain the frictional engagement, a hub for connection to a drive output of the assembly, the improvement comprising:

- a pair of disks mounted in axial spaced-apart relation on the hub and in-between the said members, each disk having annularly arranged apertures;
- a plurality of resilient elements each having a metallic inner sleeve coaxial to the outer sleeve, and resilient means bonded to the inner and outer sleeve, the elements respectively received in the apertures of the disks and being annularly arranged about the axis of the disks, the elements having their respective outer sleeves secured thereto, so that the several elements are axis parallel to each other and to the axis of said coupling output; and
- means for securing the inner sleeves of the elements in the one disk to one of the members and the inner sleeves of the elements in the other disk to the other one of the members, the resilient elements being axially biased for urging each of the members in the respective opposite axial direction so as to disengage them from the primary input when the hydraulic means are pressure relieved.

6. In a clutch assembly as in claim 5, said primary input being the casing for a double cone friction clutch, the members being frustoconical arranged in mirror symmetry to each other, the respective disk running peripherally inside of the respective cone, the elements tending to move the members axially towards each other.

7. In a clutch as in claim 6, each of member having an annular ring portion at the axial end of the frustocone of smallest diameter, the inner sleeves of the elements in the respective disk being bolted to said ring.

8. In a clutch as in claim 6, one member provided with an annular piston chamber, the other member provided with an annular piston, said piston chamber and piston both arranged at the respective axial end of largest diameter of the cone, and stop means on the piston and piston chamber for limiting axial contraction of the members upon pressure relief in the piston chamber.

9. In a clutch as in claim 6, including a stop ring on the hub, the members bearing against the ring when the hydraulic means are pressure relieved, the resilient elements remaining biased in that position of the members.

10. In a clutch as in claim 5, the primary input being an annular disk, the members each having an annulus respectively for friction engagement with the primary annular disk frm opposite sides, the members having annular cages open towards the center, the respective apertured disks extending into the cages, the elements spreading the members apart when the hydraulic means is pressure relieved.

11. In a clutch as in claim 5, and including stop means on the hub, the members abutting the stop means when the hydraulic means is pressure relieved, the elements still being axially under tension urging the members against the stop means.

* * * * *